United States Patent [19]

Gazza

[11] 3,830,652

[45] Aug. 20, 1974

[54] HOT PRESSED, HIGH STRENGTH SILICON NITRIDE

[75] Inventor: George E. Gazza, Sudbury, Mass.

[73] Assignee: The United States of America as represented by the Secretary of the Army, Washington, D.C.

[22] Filed: June 28, 1973

[21] Appl. No.: 374,603

[52] U.S. Cl.................. 106/58, 106/73.2, 106/73.5
[51] Int. Cl............................................. C04b 35/58
[58] Field of Search ........... 106/55, 39.5, 73.2, 73.5

[56] References Cited
UNITED STATES PATENTS
3,108,887  10/1963  Lenie et al............................ 106/65

Primary Examiner—J. Poer
Attorney, Agent, or Firm—Edward J. Kelly; Herbert Berl

[57] ABSTRACT

The fabrication of high strength, high density, silicon nitride by the addition of between 1.0 to 3.5 percent by weight of yttrium in the form of a compound to silicon nitride powder and pressing the material at temperatures of between 1,750° C. and 1,800° C. and at uniaxial pressures of between 6,000 and 7,000 psi.

11 Claims, No Drawings

HOT PRESSED, HIGH STRENGTH SILICON NITRIDE

The invention described herein may be manufactured, used and licensed by or for the Government for governmental purposes without the payment to me of any royalty thereon.

The present method relates to an improved hot pressed silicon nitride compact having between 1.0 to 3.5 percent by weight of yttrium incorporated therein in the form of an yttrium compound such as yttrium oxide, yttrium chloride or yttrium nitrate. When the yttrium compound is yttrium oxide, the amount of yttrium oxide is about 1.25 to 4.45 weight of the silicon nitride.

The literature discloses the use of silicon nitride in the production of refractory bodies and the addition of several materials thereto to enhance the strength by increasing the creep resistance of such bodies at high temperatures. These added materials include chromium carbide and magnesium oxide among other. While the final products have shown a greater ability to withstand creep at higher temperatures, the need for bodies with still higher stability continues. The products find great utility in component parts of gas turbine engines and other products that are subjected to stress and high temperatures in their normal use. It has been discovered that by the addition of small amounts of an yttrium containing compound to silicon nitride and subjecting the composition to elevated temperatures and the resultant product is a monolithic silicon nitride having greater strength properties and stabiity at high temperatures plus a density as high as the theoretical density for silicon nitride; suitable temperatures are between about 1,750° C. and about 1,800° C., and suitable pressures are between about 6,000 psi and about 7,000 psi.

It is an object of the present invention to provide and disclose high strength, high density silicon nitride containing an yttrium component as an additive.

It is a further object of the present invention to provide and disclose a method for the production of high strength, high density silicon nitride containing an yttrium component as an additive.

Other objects and a fuller understanding of the invention may be ascertained from the following description and claims.

Silicon nitride is produced as a powder by the reaction of nitrogen and silicon under appropriate conditions. The resultant product comprises about 98-99 percent silicon nitride with 1-2 percent impurities in the form of calcium, aluminum, iron, nickel, and titanium. In addition, the silicon nitride has silica incorporated in the granular structures thereof and is composed of 80-90 percent alpha phase and 10-20 percent beta phase. Generally a high percent of alpha phase in the powdered state results in a higher strength material when sintered. The monolithic configuration that results from the sintering has a density that is somewhat less that which is the theoretical density, limited strength properties and stability at high temperatures. It is belived that the silica is formed on silicon nitride crystals during production and when the material is subjected to heat and pressure during sintering, it assumes a glass-like characteristic. This glass composition has a relatively low liquifying temperature and low strength properties. It is also believed that as the mortar-like linkage between the silicon nitride crystals it incorporates poor structural properties into the monolith by promoting instability at high temperatures through grain creeping when subjected to heavy loads at high temperatures. In addition the density of the hot pressed product is greater than that for the sintered product.

Solutions to this problem have varied from trying to produce the silicon nitride by other methods; using nitrogen in the reaction and converting the free silicon to a crystalline compound. The compositions added in the past to react with the elemental silicon include magnesiumoxide and chromium carbide. While successful to some degree, they did not approach the ideal situation in which the resultant silicon compound achieves the stability that equals or exceeds that of the silicon nitride. I have found that by adding any yttrium compound to the silicon nitride to produce an yttrium-silicate composition from the silicon nitride that the monolithic product resulting from the sintering operation has a higher heat stability than similar products as well as a greater density. In an example of this process, 30 grams of −100 mesh silicon nitride and 0.6 grams (or 2 percent by weight) of yttrium oxide powder (−325 mesh) were mixed together with a small amount of ethyl alcohol to form a slurry. The slurry was placed in a mill jar together with several tungsten carbide balls and mixed for approximately twentyfour hours. The slurry was then removed and dried under an infra red lamp. Approximately 18 grams of the dried powder was placed in a graphite die whose walls and plunger face were earlier coated with a boron nitride slurry to prevent a reaction between the die and the silicon nitride powder. The loaded die was heated, under 1 atmosphere of nitrogen gas to 1,500° C. A uniaxial pressure of approximately 6,500 psi was applied and the temperature was raised to 1,750° C and held for 2 hours. Pressure was released after the 2 hour hold time and the die was slowly cooled. The hot pressed specimen was removed from the die and cleaned on its surfaces. The bulk density of the specimen was determined to be 3.25g/cc based upon the liquid immersion technique. Bend specimens were machined from the sample and tested at room temperature in four point bending. Based upon the testing, an average modulus of rupture value of 102,000 psi was calculated. A piece of the specimen was polished and etched and magnified 11,600X through a Phillips electron microscope.

The foregoing example illustrates the process and product based upon the use of yttrium oxide. Other reactive yttrium compounds may be used as a source of the yttrium such as yttrium chloride or yttrium nitrate.

Having described my invention and being aware of the fact that conditions may be varied without departing from the inventive concept, I claim:

1. A high density, high strength monolithic composition comprising essentially silicon nitride and an yttrium compound, wherein the weight of yttrium in the yttrium compound is about 1.0 to 3.5 percent of the weight of the silicon nitride.

2. A composition according to claim 1 in which the yttrium compound is a member of the group consisting of yttrium chloride, yttrium nitrate and yttrium oxide.

3. A composition according to claim 1 in which the yttrium compound is yttrium oxide.

4. A composition according to claim 3 in which the amount of yttrium oxide is about 1.25 to 4.45 weight percent of the weight of the silicon nitride.

5. A method of enhancing the strength of a silicon nitride monolith which comprises adding a powdered yttrium compound to powdered silicon nitride, the weight of yttrium in the yttrium compound being about 1.0 to 3.5 percent of the weight of the silicon nitride, and sintering the composition by hot-pressing.

6. A method according to claim 5 in which the yttrium compound is yttrium oxide.

7. A method according to claim 6 in which the amount of yttrium oxide is about 1.25 to 4.45 weight percent of the silicon nitride.

8. A method in accordance with claim 7 in which the sintering is carried out at temperatures between 1,750° C. and 1,800° C. and at pressures between 6,000 psi and 7,000 psi.

9. A method in accordance with claim 5 in which the sintering is carried out at a temperature of about 1,750° C. to 1,800° C. and at a pressure of about 6,000 psi to 7,000 psi.

10. A method in accordance with claim 9 in which the sintering is carried out at a temperature of about 1,750° C. to 1,800° C. and at a pressure of about 6,000 psi to 7,000 psi.

11. A method in accordance with claim 5 in which the yttrium compound is a member of the group consisting of yttrium chloride, yttrium nitrate and yttrium oxide.

* * * * *